United States Patent [19]

Morinari et al.

[11] 4,443,918
[45] Apr. 24, 1984

[54] PROCESS OF PRODUCING GRIDS FOR A BATTERY

[75] Inventors: Ryosuke Morinari; Mitsuru Koseki, both of Honjoh, Japan

[73] Assignee: Shin-Kobe Electric Machinery Co., Ltd., Tokyo, Japan

[21] Appl. No.: 283,990

[22] Filed: Jul. 16, 1981

[30] Foreign Application Priority Data

Jul. 18, 1980 [JP] Japan ................................ 55-98322
May 25, 1981 [JP] Japan ................................ 56-79087

[51] Int. Cl.$^3$ ............................................. B23P 13/00
[52] U.S. Cl. ........................................... 29/3; 429/242
[58] Field of Search ...................... 29/2; 429/241–244; 51/320

[56] References Cited

U.S. PATENT DOCUMENTS 2,669,810  2/1954  Carlson et al. ..................... 51/320
3,947,936  4/1976  Wheadon ............................ 29/2
4,305,187  12/1981  Iwamura et al. ................... 29/2

FOREIGN PATENT DOCUMENTS 56-106369  8/1981  Japan ................................ 429/242

Primary Examiner—William R. Briggs
Assistant Examiner—Lawrence Meier
Attorney, Agent, or Firm—Pearne, Gordon, Sessions, McCoy, Granger & Tilberry

[57] ABSTRACT

This invention relates to a process of producing plate grids for a lead acid storage battery. The process of the invention comprises the step of striking hard particles against surfaces of grid material to form roughness on the surfaces of the plate grids. The hard particles may be struck against surfaces of a lead alloy strip which the plate grids are to be made of by expanding or punching. They may be struck against surfaces of a mesh-like lead alloy strip which is formed by expanding or punching a lead alloy strip. Otherwise, they may be struck against the surfaces of a lead alloy strip and then against the surfaces of the mesh-like lead alloy strip which is formed by expanding or punching the roughened lead alloy strip.

9 Claims, 7 Drawing Figures

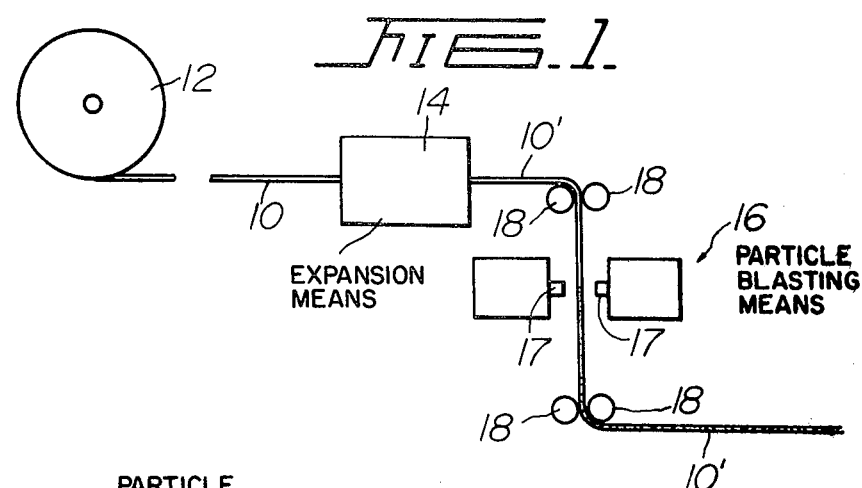
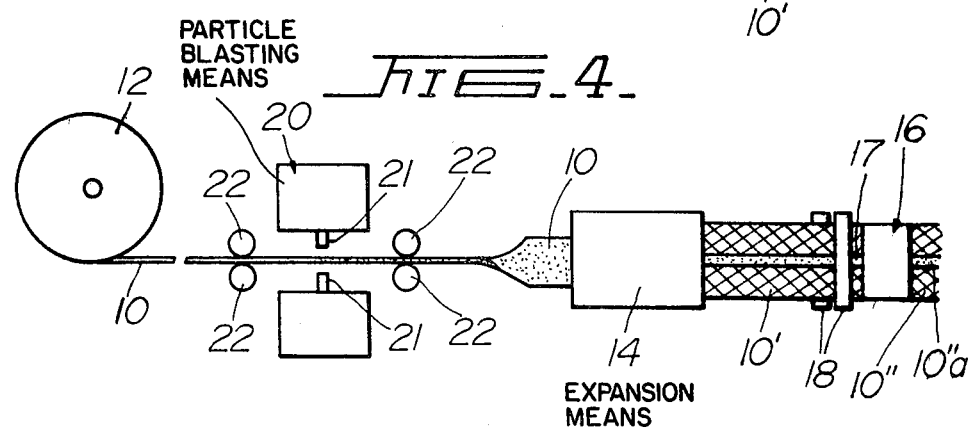
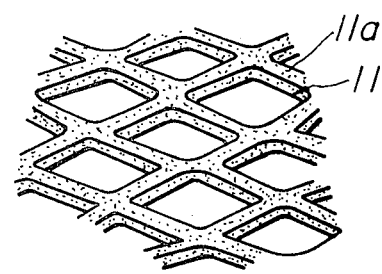

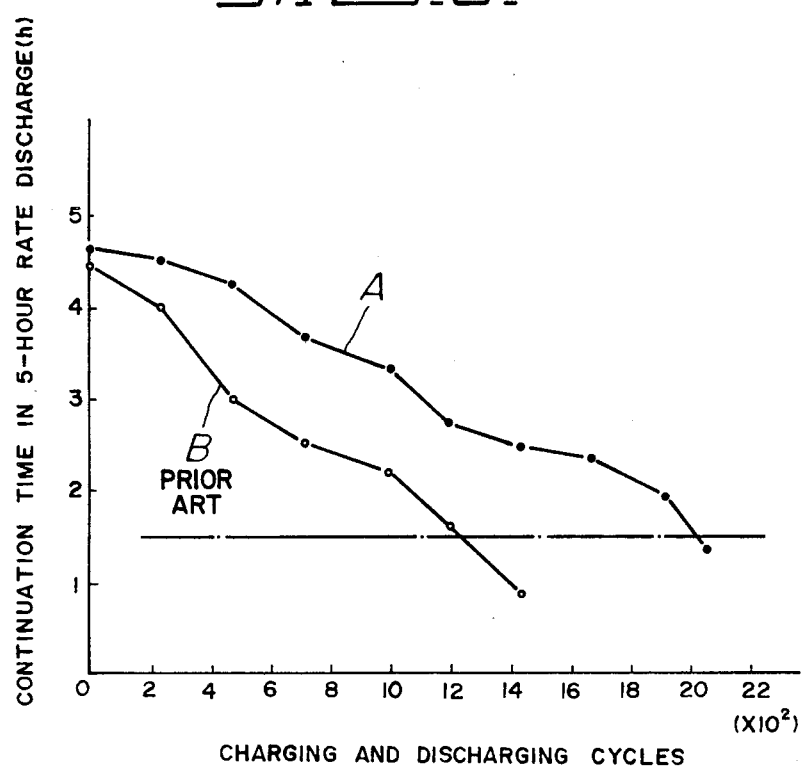

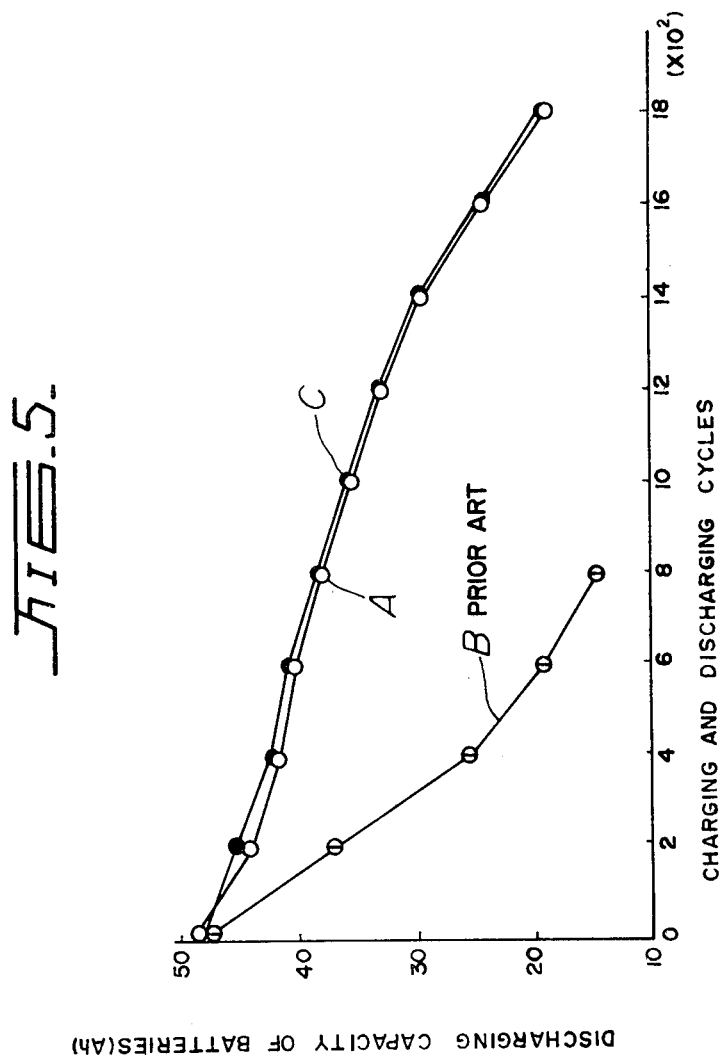

PROCESS OF PRODUCING GRIDS FOR A BATTERY

BACKGROUND OF THE INVENTION

Of late, Pb-Ca alloy has been used for plate grids because it is more convenient for maintenance of a lead acid storage battery than Pb-Sb alloy. Meanwhile, in order to automatically produce plate grids to improve the efficiency at which the plate grids are produced and to delete the conventional operation of casting plate grids under unfavorable circumstances, it has been developed to expand or punch a lead alloy strip to form plate grids. In the United States, storage batteries for cars have been commercially available which have the expanded plate grids provided therein. The expanded plate grids can be more efficiently produced than cast plate grids because the former are produced by succesively expanding a lead alloy strip while supplied from a roll of lead alloy strip. Since the cast plate grids are cast in a casting mould in which only one or two plate grids can be cast, they are produced at a lower efficiency. On the other hand, the plates having expanded grids can be obtained by a flow production of supplying the lead alloy strip, expanding it, pasting the thus produced mesh-like strip, drying it and cutting it to form individual grids. This allows the plate grids to be automatically produced.

However, a storage battery having expanded plate grids of Pb-Ca alloy has the disadvantage that the storage battery has a lower capacity than a storage battery having cast plate grids of Pb-Sb alloy. Various factors will be considered to cause the capacity of the storage battery having the expanded plate grids to be lowered, which is referred to later as cycle deterioration, but tight adhesion between the plate grids and active materials is considered to be one of the important factors. We believe that improvement on tight adhesion between the plate grids and the active materials contributes largely to prevention of the cycle deterioration.

It is known from various literatures that antimony of Pb-Sb alloy plate grids serves largely to improve the adhesion between the plate grids and the active materials. But calcium of Pb-Ca alloy plate grids cannot expect such an improvement of the adhesion between the plate grids and the active materials.

In addition to such a disadvantage of Pb-Ca alloy of which the plate grids are made, the expanded plate grids have such a disadvantage that they have surfaces flatter than the cast plate grids. The cast plate grids have surfaces substantially roughened by transferring to the surfaces of the plate grids the contour of fine powder of cork which is sprayed against a surface of a casting mould and referred to as a slip agent (heat insulating agent and removal agent). Thus, the active materials are mechanically meshed with the plate grids by the roughness of the plate grids and the surface area of the plate grids increases because of the roughness of the grid surfaces. These assure the substantial adhesion of the active materials with the plate grids. On the other hand, the expanded plate grids cannot expect such a mechanical mesh of the active materials with the plate grids because they are formed by rolling the lead alloy strip. Furthermore, the expanded plate grids are so formed by cutting the expanded lead alloy strip by a predetermined length that the sectional faces of the plate grids are flatter than the surfaces of the cast plate grids although it has a microscopical roughness. Thus, it will be noted that the surface area of the expanded plate grids is smaller than that of the cast plate grids. On casting ingot for making the lead alloy strip, a calcium oxide layer is possibly formed on the surface of the ingot. Thus, the calcium oxide layer is also covered on the surface of the expanded plate grids which are produced by rolling and working the lead alloy strip. This will cause the adhesion between active materials and the plate grids to be lowered.

Such a poor adhesion between the active materials and the plate grids has been experienced in our tests in which we can determine this by dropping the active materials out of the plate grids while the plate is being vibrated. In comparison of the cast plate grids of Pb-Ca alloy with the expanded plate grids of Pb-Ca alloy, it has been assured that the latter has a cycle deterioration more than the former. This suggests that the poor adhesion between the active materials and the plate grids causes the cycle deterioration to be larger.

SUMMARY OF THE INVENTION

Accordingly, it is a principal object of the invention to provide a process of producing plate grids for a lead acid storage battery which can improve an adhesion of active materials with the surfaces of the plate grids so as to prevent a cycle deterioration of the storage battery.

It is another object of the invention to provide plate grids for a lead acid storage battery which have an improved adhesion to active materials.

In accordance with one aspect of the invention, there is provided a process of producing plate grids for a lead acid storage battery comprising the step of striking hard particles against surfaces of grid materials to form roughness on the surfaces of said plate grids.

In accordance with another aspect of the invention, there is provided plate grids for a lead acid storage battery having surface roughened by striking particles against them.

BRIEF DESCRIPTION OF THE DRAWINGS

The above and other objects and features of the invention will be apparent from the description of the embodiments taken along with the accompanying drawings in which;

FIG. 1 schematically illustrates a process of producing plate grids for a lead acid storage battery according to one embodiment of the invention;

FIG. 2 is an enlarged perspective view of a portion of a plate grid produced in accordance with the invention;

FIG. 3 shows curves of discharging capacity relative to charging and discharging cycles with respect to an example of the invention and a prior art;

FIG. 4 schematically illustrates a process of producing plate grids for a lead acid storage battery according to another embodiment of the invention;

FIG. 5 shows curves of discharging capacity relative to charging and discharging cycles with respect to another example of the invention and another prior art;

DETAILED DESCRIPTION OF THE EMBODIMENTS

Figure 6:
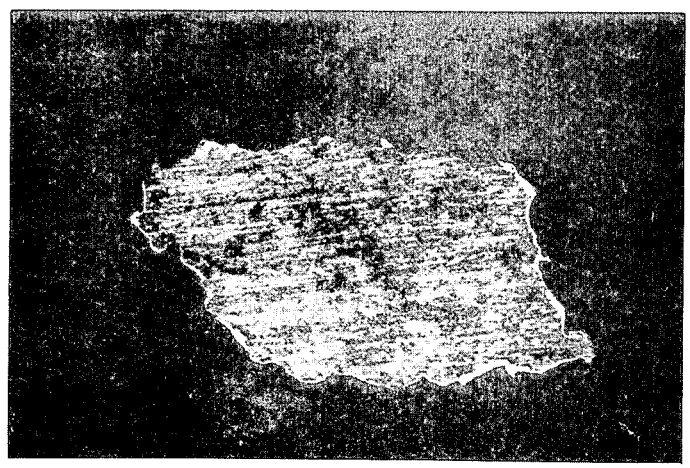
FIG. 6 shows a microscopical section of an expanded plate grid of the invention.

As shown in FIG. 1, a strip of Pb-Ca alloy 10 is supplied out of a roll 12 of Pb-Ca alloy strip and worked through expansion means 14 to form a mesh-like Pb-Ca alloy strip 10' as shown in FIG. 2. The Pb-Ca alloy strip may be composed of 0.8 weight % of Ca, 0.5 weight % of Sn and the remainder of Pb and has a width of 70 mm and the thickness of 1.0 mm. The mesh-like Pb-Ca alloy strip 10' is conventionally formed by the expansion means 14 which slits and expands it.

The mesh-like strip 10' then passes through particle blasting means 16 while being guided in a vertical direction by two pairs of guide rollers 18 and is cut to form a plurality of plate grids 11 as shown in FIG. 2. The particle blasting means 16 is provided with a pair of nozzles 17 which strike or blast particles against the opposing surfaces of the mesh-like Pb-Ca alloy strip 10'. As noted from FIG. 1, the nozzles are directed to the surfaces of the mesh-like strip 10' at a right angle. Thus, the mesh-like strip 10' moves so as to pass across the motion of the particles.

Figure 7:
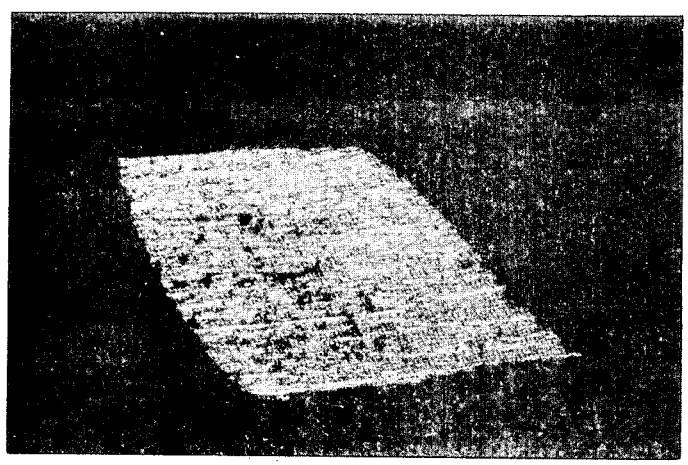
FIG. 7 shows a microscopical section of an expanded plate grid of the prior art.

The blasting particles may be ones of suitable hardness such as sand or grit and may be preferably crushed particles of $Al_2O_3$ of diameter of 0.5 to 2.0 mm which have a sharp angle defined by the intercrossed faces of the particles. They may be blasted against the surfaces of the mesh-like strip 10' under a pressure of 5 kg/cm$^2$ together with air. After the blasted particles strike the surface of the strip 10', they are scattered. Thus, the surfaces of the mesh-like strip 10' are deformed and partially shaved off by striking the particles against the surfaces of the mesh-like strip 10' so as to provide a roughness thereto. Since the mesh-like Pb-Ca alloy strip 10' is relatively softer in spite of its age hardening or work hardening than relatively harder material such as cast iron, the mesh-like Pb-Ca alloy strip 10' can be deformed to form a rough surface thereon. Thus, it will be noted that the mesh-like Pb-Ca alloy strip 10' has a remarkable degree of roughness of surfaces as shown in FIG. 6. It should be compared with the section of the mesh-like Pb-Ca alloy strip of FIG. 7 which is not treated by the grit blast. It will be noted that the mesh-like Pb-Ca alloy of FIG. 7 has a surface flatter than that of FIG. 6.

Variation in weight of plate grids on blast treatment should be avoided because it has an adverse affect on the performance of the storage battery. Under the circumstances where the storage battery for a car is required to have a light weight, the plate grids have a critical light weight. Therefore, more than 3 g of variation in weight per one plate grid has a serious problem. In our examination of variation between weights of the plate grids before and after blast treatment, it was found that only 0.3 to 0.5 g per one plate grid varied. It will be thus noted that the roughness of the surfaces of the plate grids is caused largely by deformation of the grid surfaces.

Since the grid materials are always treated by sand or grit blast, all the surfaces of the plate grids are roughened. It should be noted that the particle blasting means is so arranged that the particles are blasted against all the surfaces of the mesh-like strip 10' because four faces of bones 11a are angled relative to the main surfaces of the plate grids.

It will be understood that the degree of roughness of the grid surfaces are able to be controlled by roughness of the particles to be used and their blasting velocity (which can be adjusted by air pressure). Preferable degree of roughness of the grid surfaces depends on the required performance of the storage battery. In case of the plate grids with the sectional area of grid bones 11a being 1×0.7=0.7 mm$^2$ which are made by expanding the lead alloy strip of 1 mm thickness composed of 0.08 weight % Ca, 0.05 weight % Sn and the remainder lead and having the slots spaced at 0.7 mm and provided therein, the degree of roughness of the grid surfaces is about 0.035 to 0.08 mm.

Although material of the particles to be used for blast treatment may be preferably $Al_2O_3$, it may be one having no adverse affect on the battery performance such as WC, SiC and $SiO_2$. The particles struck against the grid surfaces are usually scattered without their intrusion into the grid surfaces, but they will microscopically adhere to the grid surfaces. In case of plate grids of Pb-Ca alloy, if the particles include materials having an adverse affect of electrolyte decrease such as Fe and Cu, the adhesion of the particles should be avoided. Thus, it should be carefully avoided to use the particles having impurities mixed or having an adverse affect on the battery performance.

In order to confirm the effect of the invention, two lead storage batteries were prepared. One of the lead storage batteries (of the invention) has plates provided with expanded grids blasted by particles as shown in FIG. 1 and filled with active materials while another storage battery (of the prior art) has plates provided with expanded grids not blasted by particles and filled with active materials. The lead alloy strip used for the expanded grids was composed of 0.08 weight % of Ca, 0.05 weight % of Sn and the remainder of Pb. The thickness of the strip was 1.00 mm for positive plates and 0.8 mm for negative plates. The width between adjacent slots was 0.7 mm for both of the positive and negative plates. The expanded grids for both of the positive and negative plates had the size of 111 mm long and 145 mm broad. The thickness of the grids for the positive plates was 1.4 mm while that for the negative plates was 1.1 mm. The plate grids according to the invention were blasted by the particles for both of the positive and negative plates. The particles used were ones of $Al_2O_3$ of 99.99 % purity including an extremely small amount of $TiO_2$ and had the size of 1.2 mm. The particles were blasted together with air of 5 kg/cm$^2$. The depth of the thus formed roughness of the grid surfaces was about 0.05 mm. The positive plates for both of the storage batteries of the invention and the prior art had active material of 90 g/one plate filled therein while the negative plates for both of the storage batteries of the invention and the prior art had active material of 80 g/one plate filled therein. Both of the storage batteries of the invention and the prior art had five positive plates and six negative plates used therein.

Both of the storage batteries were discharged at 200 A for one second, which was repeated three times. Thereafter, they were charged by a limited current of 25 A at a constant voltage of 15 V for 11 minutes, then discharged at a constant current of 10 A for 16.5 minutes and stopped being discharged for 2.4 minutes. This was one cycle and a life test was made at heat cycles from −15° C. for 24 hours to 45° C. for 24 hours.

The results of cycle deterioration of the storage batteries are shown in FIG. 3. A curve A of FIG. 3 shows the cycle deterioration of the storage battery produced according to the invention while a curve B of FIG. 3 shows that of the storage battery of the prior art. As noted from FIG. 3, the storage battery of the invention has a cycle deterioration less than that of the prior art. Thus, it will be noted that the example of the invention is more advantageous than that of the prior art.

FIG. 4 shows another embodiment of the invention in which the strip of Pb-Ca alloy is treated by a first particle blasting means 20 while being guided by two pairs of guide rollers 22 in a vertical manner. After it is turned to a horizontal manner by means not shown, it is expanded by the expansion means 14 to form the expanded strip of Pb-Ca alloy. Thereafter, it is further turned to a vertical manner by the guide rollers 18 and treated by the second particle blasting means 16 as constructed in the same manner as the particle blasting means 16 of FIG. 1. The first particle blasting means 20 has a pair of nozzles 21 in the same manner as the second particle blasting means 16. The first and second blasting means 20 and 16 have the two pairs of nozzles 21 and 17 faced to the opposing surfaces of the non-expanded strip 10 and the expanded strip 10' at a substantially right angle, as shown in FIG. 4. Although the roughened surfaces of the strips 10 and 10' are formed by deforming and also by shaving, but they are formed mainly by deforming for the same reason as described with respect to the embodiment of FIG. 1. In FIG. 4, the reference numeral 10'' designates the expanded strip blasted by the particles to form the roughness on all the faces of the expanded strip. As noted from FIG. 4, the mesh-like strip 10'' has a central non-expanded portion 10''a which forms lugs of the grids 11 when the mesh-like strip 10'' is cut to form the plate grids 11. Materials and sizes of the lead alloy strip 10 and of the particles may be identical to those of the lead alloy and of the particles described with reference to the embodiment of FIG. 1.

FIG. 5 shows the results of comparison of the cycle deterioration of the storage batteries produced in accordance with the invention and the prior art. Both of positive and negative plates have the width of 145 mm and the height of 111 mm and the storage batteries have five positive plates and six negative plates provided therein. The storage batteries have open-circuit voltage of 2 V. The storage battery of the invention has the plates of grids produced by the process of FIG. 4 while the storage battery of the prior art has the plates of grids formed by expanding the Pb-Ca alloy strip, but not blasted by the particles. The storage batteries were discharged at 10 A for 16.5 minutes and then charged by a limited current of 25 A at a constant voltage of 2.5 V for 11 minutes, which was one cycle. The capacity of the storage batteries was confirmed after complete discharge of 10 A during one cycle.

In FIG. 5, a curve A shows variation in the discharge capacity of the storage battery produced according to the invention while a curve B shows that of the storage battery according to the prior art. A curve C shows variation in the discharge capacity of the storage battery having the plates of grids formed by expanding the strip of Pb-Ca alloy, cutting it to form the grids and then blasting the particles against the surfaces of the grids. As noted from FIG. 5, the storage battery of the invention has a life substantially longer than that of the prior art and substantially identical to that of the storage battery having the plates of grids blast-treated after expansion as indicated at the curves A and C. It should be noted that the plate grids of the invention which are formed by blasting the particles against the lead alloy strip and then cutting it can be more efficiently produced than the plate grids which are formed by cutting the lead alloy strip to form plate grids and then blasting the particles against them.

Although some preferred embodiments of the invention have been illustrated and described with reference to the accompanying drawings, it will be understood by those skilled in the art that various changes and modifications may be made without departing from the spirit and scope of the invention. For example, the particles may be blasted against only the surfaces of the lead alloy strip before expansion. It will be noted that, in this case, the roughness is formed on the main opposing surfaces of the plate grids and not formed on the sectional faces of the plate grids which are provided by the slots formed during the expansion of the strip. Furthermore, the plate grids to which the invention may be applied may be formed by punching a lead alloy strip. In this case, the particles may be struck against the lead alloy strip before or after it is punched. Thus, it will be understood that the invention is intended to be defined only by the appended claims.

What is claimed is:

1. A process of producing plate grids for a lead acid storage battery comprising the steps of:
    striking hard particles against surfaces of grid material to form roughness on the surfaces thereof with such grid material disposed in a vertical plane;
    forming said grid material into a mesh-like grid material; and
    striking hard particles against surfaces of said mesh-like grid material to form roughness on all surfaces thereof with said mesh-like material disposed in a vertical plane.

2. A process of producing plate grids for a lead acid storage battery as set forth in claim 1, wherein said grid material is a lead alloy strip which is to be expanded and cut to form said plate grids.

3. A process of producing plate grids for a lead acid storage battery as set forth in claim 1, wherein said second grid material is a mesh-like lead alloy strip being formed by expansion, said mesh-like strip being cut to form said plate grids after said particles are struck against said mesh-like strip.

4. A process of producing plate grids for a lead acid storage battery as set forth in claim 1, wherein said grid material is a lead alloy strip which is to be punched to form a mesh-like strip and to be cut to form said plate grids.

5. A process of producing plate grids for a lead acid storage battery as set forth in claim 1, wherein said particles are struck firstly against surfaces of a lead alloy strip and then against surfaces of a mesh-like strip which is formed by expanding said lead alloy strip against which said particles are struck, said mesh-like strip being cut to form said plate grids after said particles are struck.

6. A process of producing plate grids for a lead acid storage battery as set forth in claim 1, wherein said grid material is composed of Pb and Ca.

7. A process of producing plate grids for a lead acid storage battery as set forth in claim 1, wherein said particles are struck against said grid material in a right angle direction.

8. A process of producing plate grids as set forth in claim 1, wherein the process includes acting on the grid material to form a mesh-like strip.

9. A process of producing plate grids as set forth in claim 8, wherein said second striking step is performed in said mesh-like strip.

* * * * *

UNITED STATES PATENT AND TRADEMARK OFFICE
CERTIFICATE OF CORRECTION

PATENT NO. : 4,443,918
DATED : April 24, 1984
INVENTOR(S) : Ryosuke Morinari; Mitsuru Koseki It is certified that error appears in the above—identified patent and that said Letters Patent is hereby corrected as shown below:

Claim 3, line 37, "mesh-like" should be deleted

Signed and Sealed this

Sixteenth Day of October 1984

[SEAL]

Attest:

GERALD J. MOSSINGHOFF

*Attesting Officer*     *Commissioner of Patents and Trademarks*